(12) United States Patent
Priser et al.

(10) Patent No.: US 11,677,180 B2
(45) Date of Patent: Jun. 13, 2023

(54) CONNECTOR FOR CONNECTING TOGETHER UNDERWATER CABLES AND IN PARTICULAR UMBILICAL CABLES FOR RENEWABLE MARINE ENERGY FARMS

(71) Applicant: NAVAL ENERGIES, Paris (FR)

(72) Inventors: Mathieu Priser, Paris (FR); Alban Van Den Broek, Paris (FR); Benoît Leduc, Paris (FR)

(73) Assignee: NAVAL ENERGIES, Paris (FR)

( * ) Notice: Subject to any disclaimer, the term of this patent is extended or adjusted under 35 U.S.C. 154(b) by 0 days.

(21) Appl. No.: 16/980,809

(22) PCT Filed: Mar. 19, 2019

(86) PCT No.: PCT/EP2019/056785
§ 371 (c)(1),
(2) Date: Sep. 14, 2020

(87) PCT Pub. No.: WO2019/179986
PCT Pub. Date: Sep. 26, 2019

(65) Prior Publication Data
US 2021/0257774 A1 Aug. 19, 2021

(30) Foreign Application Priority Data

Mar. 19, 2018 (FR) ..................... 18 52310

(51) Int. Cl.
*H01R 13/523* (2006.01)
*H01R 13/633* (2006.01)
(Continued)

(52) U.S. Cl.
CPC ....... *H01R 13/523* (2013.01); *H01R 13/6335* (2013.01); *H01R 2103/00* (2013.01); *H02G 9/00* (2013.01)

(58) Field of Classification Search
CPC .............. H01R 13/523; H01R 13/6335; H01R 2103/00; H01R 13/631; H01R 43/26; H02G 9/00; H02G 9/12; H02G 1/08; H02G 1/10
See application file for complete search history.

(56) References Cited

U.S. PATENT DOCUMENTS 4,016,943 A    4/1977   Cullen et al.
4,362,436 A * 12/1982   Harmstorf ............... E02F 5/107
                                                                           405/164

(Continued)

FOREIGN PATENT DOCUMENTS

CN         106300147       1/2017
EP          0 902 505 A2      3/1999
(Continued)

OTHER PUBLICATIONS

International Search Report for PCT/EP2019/056785 dated May 21, 2019, 5 pages, with English Translation.
(Continued)

*Primary Examiner* — Abdullah A Riyami
*Assistant Examiner* — Nelson R. Burgos-Guntin
(74) *Attorney, Agent, or Firm* — Nixon & Vanderhye

(57) ABSTRACT

A connector for connecting underwater cables includes: a connection housing in which the cables enter parallel to each other and parallel to a first direction; and a handling bar, connected to the connection housing by a linking unit hinged along an axis perpendicular to the first direction.

17 Claims, 1 Drawing Sheet

(51) Int. Cl.
*H01R 103/00* (2006.01)
*H02G 9/00* (2006.01)

(56) References Cited

U.S. PATENT DOCUMENTS

| | | | | |
|---|---|---|---|---|
| 6,084,373 | A * | 7/2000 | Goldenberg | B25J 9/08 |
| | | | | 901/23 |
| 6,095,078 | A * | 8/2000 | Adams | B63G 7/02 |
| | | | | 114/330 |
| 6,165,013 | A * | 12/2000 | Broussard | H01R 13/523 |
| | | | | 439/933 |
| 6,402,539 | B1 * | 6/2002 | Toth | H01R 13/443 |
| | | | | 439/138 |
| 6,450,104 | B1 * | 9/2002 | Grant | B08B 9/049 |
| | | | | 104/138.1 |
| 6,745,911 | B1 * | 6/2004 | Maestranzi | H01R 13/6335 |
| | | | | 213/75 R |
| 8,535,071 | B1 * | 9/2013 | Mueller | H01R 13/6315 |
| | | | | 439/923 |
| 8,677,920 | B1 * | 3/2014 | Jeng | B63G 8/38 |
| | | | | 114/77 R |
| 9,077,099 | B1 * | 7/2015 | Hatcher | G02B 6/3816 |
| 9,597,796 | B2 * | 3/2017 | Rollinson | B25J 9/08 |
| 10,259,540 | B1 * | 4/2019 | Rush, III | B63B 35/28 |
| 10,355,334 | B2 * | 7/2019 | Bokenfohr | H01Q 1/04 |
| 10,539,753 | B1 * | 1/2020 | Leigh | G02B 6/4261 |
| 11,038,594 | B1 * | 6/2021 | Claycomb | H04B 10/40 |
| 11,155,326 | B2 * | 10/2021 | Jing | B63H 23/06 |
| 2010/0329791 | A1 * | 12/2010 | Berg | H02G 9/02 |
| | | | | 405/158 |
| 2015/0176340 | A1 | 6/2015 | Bastesen | |
| 2015/0300530 | A1 | 10/2015 | Hunter et al. | |
| 2016/0036160 | A1 * | 2/2016 | Sales Casals | G02B 6/3816 |
| | | | | 439/588 |
| 2016/0043504 | A1 * | 2/2016 | Sales Casals | H01R 43/16 |
| | | | | 439/345 |
| 2016/0245867 | A1 * | 8/2016 | Diesen | B63C 11/52 |
| 2019/0074631 | A1 * | 3/2019 | Bowman | H01R 13/631 |
| 2019/0363481 | A1 * | 11/2019 | Paynter | H01R 13/518 |
| 2020/0069855 | A1 * | 3/2020 | Matthes | A61M 60/268 |
| 2020/0335886 | A1 * | 10/2020 | Glueck | H01R 13/111 |
| 2021/0126407 | A1 * | 4/2021 | Stagner | H01R 13/7132 |
| 2021/0242626 | A1 * | 8/2021 | Bowman | H01R 43/26 |
| 2021/0273373 | A1 * | 9/2021 | Ramasubramanian | |
| | | | | H01R 13/5219 |
| 2021/0371054 | A1 * | 12/2021 | Montague | B63B 1/248 |

FOREIGN PATENT DOCUMENTS

| | | |
|---|---|---|
| EP | 2 869 409 A1 | 5/2015 |
| EP | 2 886 921 A1 | 6/2015 |
| JP | 2015-208219 A | 11/2015 |
| JP | 2017/108488 | 6/2017 |

OTHER PUBLICATIONS

Written Opinion of the ISA for PCT/EP2019/056785 dated May 21, 2019, 5 pages.
French Search Report for French Application No. 18 52310 dated Nov. 8, 2018, 2 pages.

* cited by examiner

CONNECTOR FOR CONNECTING TOGETHER UNDERWATER CABLES AND IN PARTICULAR UMBILICAL CABLES FOR RENEWABLE MARINE ENERGY FARMS

CROSS-REFERENCE TO RELATED APPLICATIONS

This application is the U.S. national phase of International Application No. PCT/EP2019/056785 filed Mar. 19, 2019 which designated the U.S. and claims priority to French Application No. 18 52310 filed Mar. 19, 2018, the entire contents of each of which are hereby incorporated by reference.

BACKGROUND OF THE INVENTION

Field of the Invention

The present invention relates to a connector for connecting underwater cables, in particular umbilical cables for renewable marine energy farms.

Description of the Related Art

Underwater cable connectors are known in the prior art. However, submersing them is sometimes difficult to implement, and usually involves mechanical stresses, in particular bending stresses on the cable protection equipment, as well as mechanical stresses when the connector lands on the seabed.

The aim of the invention is, in particular, to remedy these drawbacks by providing a connector for connecting underwater cables and facilitating their submersion.

To this end, the invention relates, in particular, to a connector for connecting underwater cables and, in particular, umbilical cables for renewable marine energy farms, characterized in that it comprises:
  a connection housing in which the cables enter parallel to each other and parallel to a first direction, and
  a handling bar, connected to the connection housing by linking means hinged along an axis perpendicular to the first direction.

The bar is designed as part of the connector structure. It remains attached to this connector when deployed, the joint being protected by a sleeve with a synthetic bearing, while it is provided with large play to ensure free rotation of the bar even after prolonged submersion.

A connector according to the invention may have one or more of the following characteristics, taken alone or in any technically feasible combination.
  The linking means comprise opposite symmetrical protruding parts of the housing.
  The bar is generally U-shaped, comprising two branches engaged on either side of the housing.
  The branches of the bar each have a connecting end, hinged on the housing by the linking means.
  The linking means comprise opposite symmetrical protruding parts of the housing, and a connecting orifice formed in each connecting end, each protruding part being engaged in a respective connecting orifice.
  The handling bar is connected to at least one handling cable.
  The connector comprises at least one ballast mass connected to the housing, preferably removably.
  The invention also relates to a system for handling a connector as defined above, characterized in that the system comprises means for actuating the housing connected to the handling cable as well as a curved ramp for moving the connector between a first supine storage position and a second upright position for submersion/retrieval, wherein it pivots about the axis of the hinged mounting means of the housing on the bar during its maneuver.
  Advantageously, the ramp comprises a first portion forming a ramp for the connection housing, and on either side of the latter, second curved guide portions of the hinged mounting means of the housing on the bar.
  The invention also relates to a marine platform, characterized in that it comprises a system as defined above.

BRIEF DESCRIPTION OF THE DRAWINGS

The invention will be better understood upon reading the description which follows, given solely by way of example and made with reference to the appended figures, among which.

DESCRIPTION OF THE PREFERRED EMBODIMENTS

Figure 1:
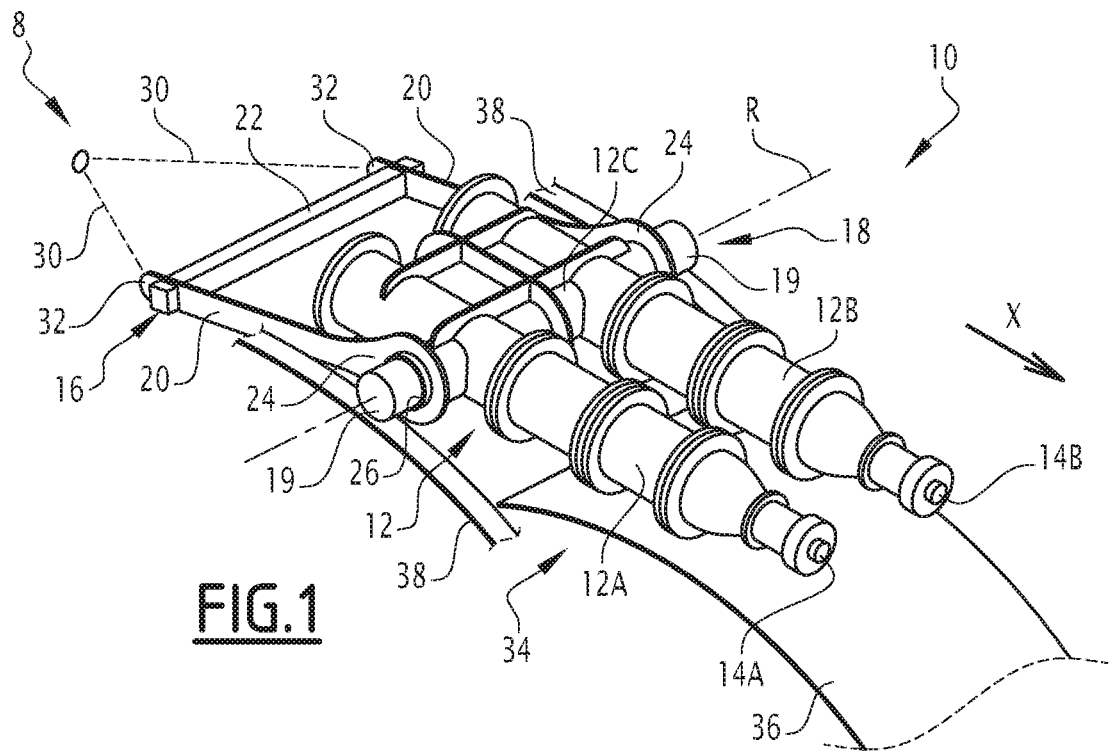
FIG. 1 is a perspective view of a handling system comprising a connector according to an exemplary embodiment of the invention.

FIG. 1 shows a system 8 for handling a connector 10 for connecting underwater cables, and, in particular, umbilical cables for renewable marine energy farms. This handling system 8 equips a marine platform.

The connector 10 according to the invention comprises a sealed housing designated by the general reference 12.

The housing 12 has a general U-shape comprising first 12A and second 12B legs, extending substantially parallel to each other, and parallel to a longitudinal direction X. Each leg 12A, 12B extends in the longitudinal direction X from an intermediate part 12C to a connection end.

The connection end of the first leg 12A, respectively second leg 12B, has a first orifice 14A, respectively second orifice 14B, for the passage of the cables to be connected.

The cables extend into the housing 12, following a U from the first orifice 14A, passing through the first leg 12A, the intermediate part 12C, and the second leg 12B, to the second orifice 14B.

The cables have electrical, optical and/or other connector elements at their ends.

The connector 10 also comprises a handling bar 16, connected to the connection housing 12 by linking means 18 hinged along an axis R perpendicular to the first direction X.

The linking means 18 comprise opposing symmetrical protruding parts 19 provided on the housing 12, and, more particularly, on the intermediate part 12C. Each protruding part 19 advantageously has a cylindrical shape with a circular section.

The bar 16 has a general U-shape, comprising two branches 20 engaged on either side of the housing 12, and interconnected by a crossbar 22.

Each branch 20 of the bar 16 comprises a connecting end 24. The linking means 18 then comprise a connecting orifice 26 formed in each connecting end 24. Each protruding part 19 engages in a respective connecting orifice 26.

It should be noted that the distance between the branches 20, in a direction parallel to the axis R, is less than the distance between the free ends of the protruding parts 19, so that these protruding parts 19 cannot disengage from the connection orifices 26. Advantageously, the length of the crossbar 22 is also less than this distance between the free ends of the protruding parts 19.

On the other hand, the length of each protruding part 19 is greater than the thickness of the corresponding linking end 24, so that each protrusion 19 protrudes from the linking end 24 by a predefined length.

The handling bar 16 is connected to at least one handling cable 30 of the handling system 8. To this end, the lifting bar 16 comprises cable fixing members 32, for example carried by the crossbar 22, and wherein, for example, each is in the extension of a respective branch 20.

Advantageously, the handling system 8 comprises two handling cables 30, each extending between a distal end connected to one of the fixing members 32 and a proximal end connected to the other handling cable 30.

The handling system 8 comprises means for maneuvering the housing 12, connected to the handling cables 30, making it possible to maneuver these cables 30.

The handling system 8 also comprises a curved ramp 34 for moving the connector 10 between a first supine storage position and a second upright position for submersion/retrieval, by pivoting about the axis R of the hinged linking means 18 of the housing 12 on the bar 16, during its operation.

The ramp 34 comprises a first portion 36 forming the main ramp for the connection housing 12, and, on either side of this main ramp 36, second curved guide portions 38 of the housing 12, interacting with the protruding parts 19 each of which rest on one respective second portions 28.

Thus, when it is submersed, the connector 10 is guided by the ramp 34 to its vertical position, by the operation of the cables 30. This guidance is made possible by the linking means 18 between the bar 16 and the housing 12.

Figure 2:
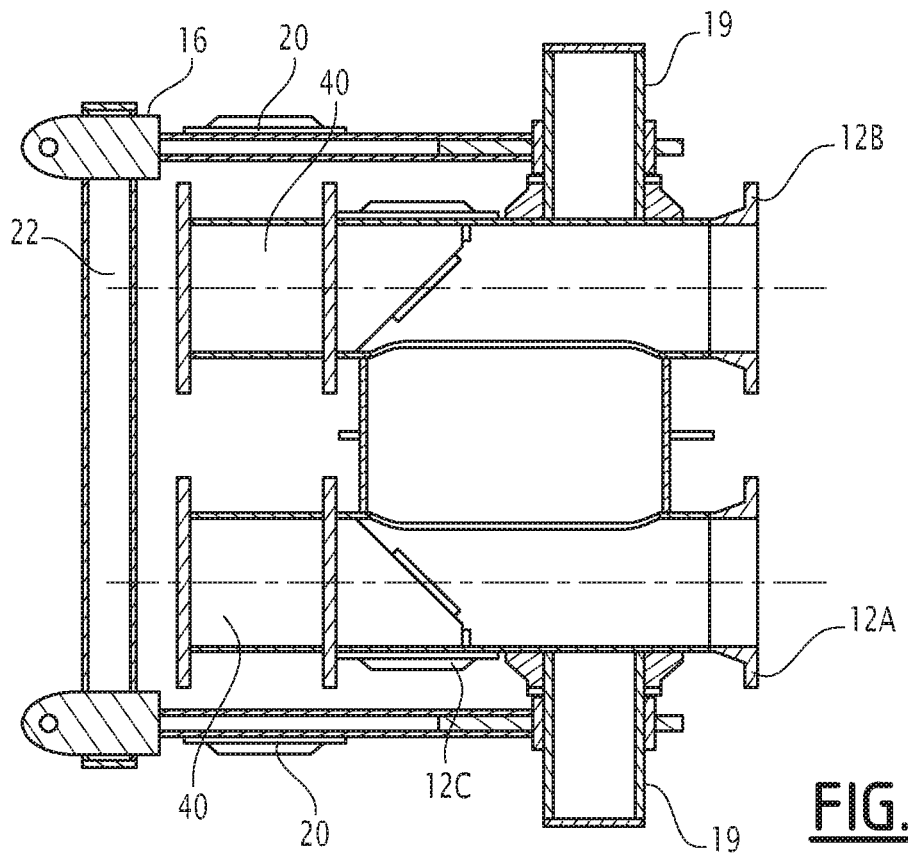
FIG. 2 is a top view of a connector according to an alternative embodiment.

Partially shown in FIG. 2 is a connector 10 according to an alternative embodiment of the invention. In this figure, elements similar to those of the previous figure are designated by identical references.

The connector 10 according to this variant differs from that of FIG. 1 in that it comprises at least one ballast mass 40 connected to the housing 12, and, more particularly, to the intermediate part 12C. More particularly, the connector 10 advantageously comprises two ballast masses 40, each in the extension of a leg 12A, 12B.

Each ballast mass 40 extends in a free space between the crossbar 22 and the intermediate part 12C. The branches 20 are sufficiently long to avoid the ballast masses 40 hindering the rotation of the bar 16 relative to the housing 12.

It should be noted that each ballast mass 40 is preferably mounted removably on the housing 12, for example by screwing this ballast mass 40 into a complementary housing of the housing 12.

The ballast masses 40 have the function of ensuring the hydrodynamic stability of the connector 10. As the ballast masses 40 are mounted removably, it is possible to easily remove or replace the ballast masses 40, in particular to provide a mass that corresponds to the intended application, for example by choosing a mass that is adapted to the current and swell conditions encountered in the sea.

Furthermore, the ballast masses 40 may be assembled at the last moment, which facilitates the handling of the connector 10.

It should be noted that the invention is not limited to the embodiment described above, but could have various additional variants.

The invention claimed is:

1. A handling system for a connector configured to connect underwater cables, the handling system comprising:
    a connection housing in which the cables enter parallel to each other and parallel to a first direction;
    a handling bar, connected to the connection housing by a link hinged along an axis perpendicular to the first direction; and
    an actuator configured to actuate the connection housing, the actuator being connected to a handling cable and a curved ramp configured to move the connection housing between a first supine storage position and a second upright position for submersion/retrieval, by pivoting about an axis of the hinged link of the connection housing on the handling bar, during operation,
    wherein the curved ramp comprises
        a first portion forming a ramp for the connection housing, and
        a plurality of second curved guide portions of the hinged link of the connection housing on the handling bar, the second curved guide portions being disposed on opposite sides of the first portion.

2. The handling system according to claim 1, wherein the link comprises opposing symmetrical protruding parts of the connection housing.

3. The handling system according to claim 1, wherein the handling bar has a general U-shape, the handling bar comprising two branches engaged on either side of the connection housing.

4. The handling system according to claim 3, wherein the branches of the handling bar each have a connecting end that is hinged on the connection housing by the link.

5. The handling system according to claim 4, wherein the link comprises
    opposing symmetrical protruding parts of the connection housing, and
    a connecting orifice formed in each of the connecting ends, each of the protruding parts being engaged in the respective connection orifice.

6. The handling system according to claim 1, wherein the handling bar is connected to at least one handling cable.

7. The handling system according to claim 1, further comprising at least one ballast mass removably connected to the connection housing.

8. A marine platform, comprising:
    the handling system according to claim 1.

9. The handling system according to claim 2, wherein the handling bar has a general U-shape, the handling bar comprising two branches engaged on either side of the connection housing.

10. The handling system according to claim 2, wherein the handling bar is connected to at least one handling cable.

11. The handling system according to claim 3, wherein the handling bar is connected to at least one handling cable.

12. The handling system according to claim 4, wherein the handling bar is connected to at least one handling cable.

13. The handling system according to claim 5, wherein the handling bar is connected to at least one handling cable.

14. The handling system according to claim 2, further comprising at least one ballast mass removably connected to the connection housing.

15. The handling system according to claim 3, further comprising at least one ballast mass removably connected to the connection housing.

16. The handling system according to claim 4, further comprising at least one ballast mass removably connected to the connection housing.

17. The handling system according to claim 5, further comprising at least one ballast mass removably connected to the connection housing.

\* \* \* \* \*